Feb. 2, 1960 V. J. BRANDT 2,923,426
RELEASABLE TOOL MOUNTING APPARATUS
Filed Oct. 14, 1957 3 Sheets-Sheet 1
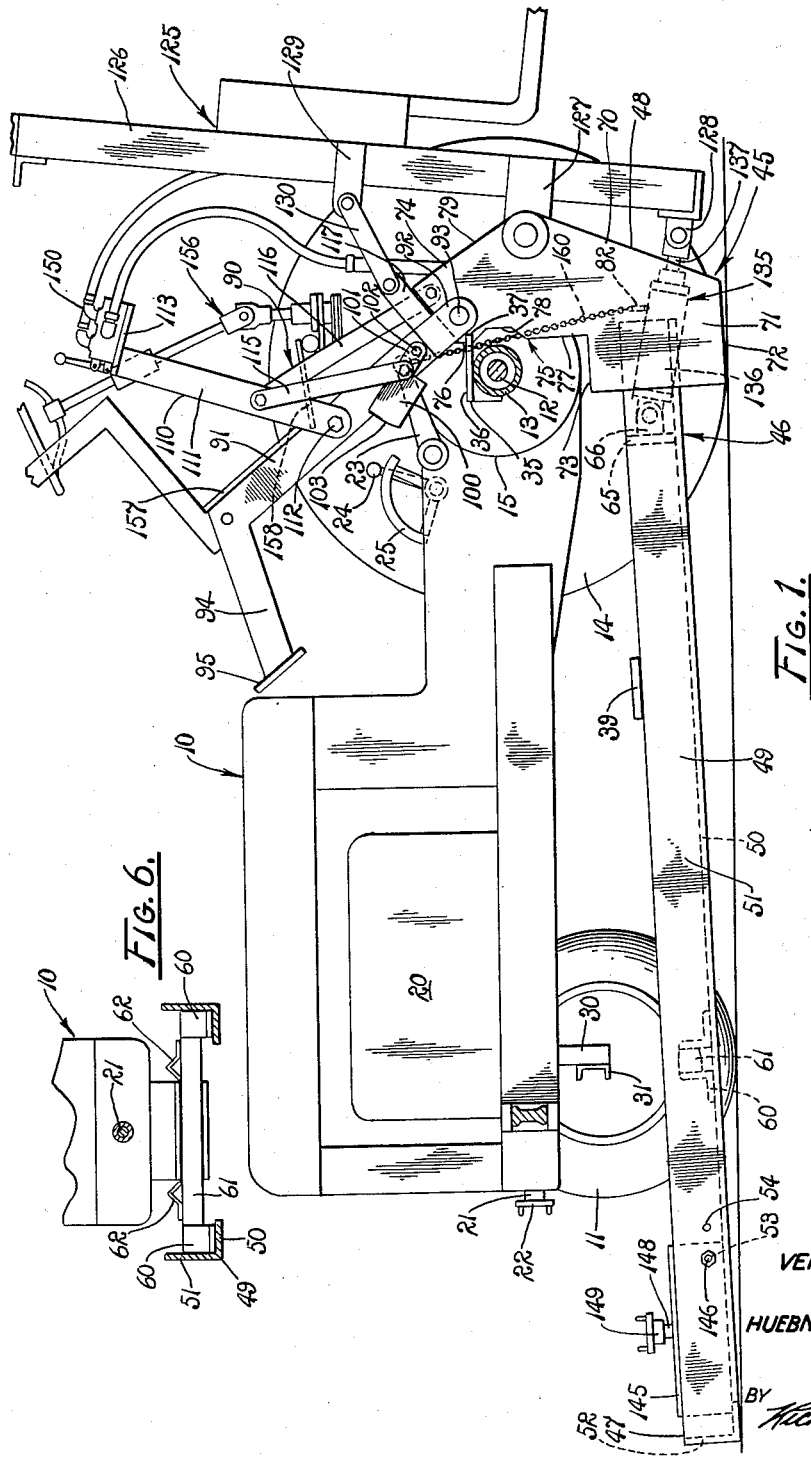
VERNON J. BRANDT
INVENTOR
HUEBNER, BEEHLER & WORREL
ATTORNEYS
BY
Richard M. Worrel

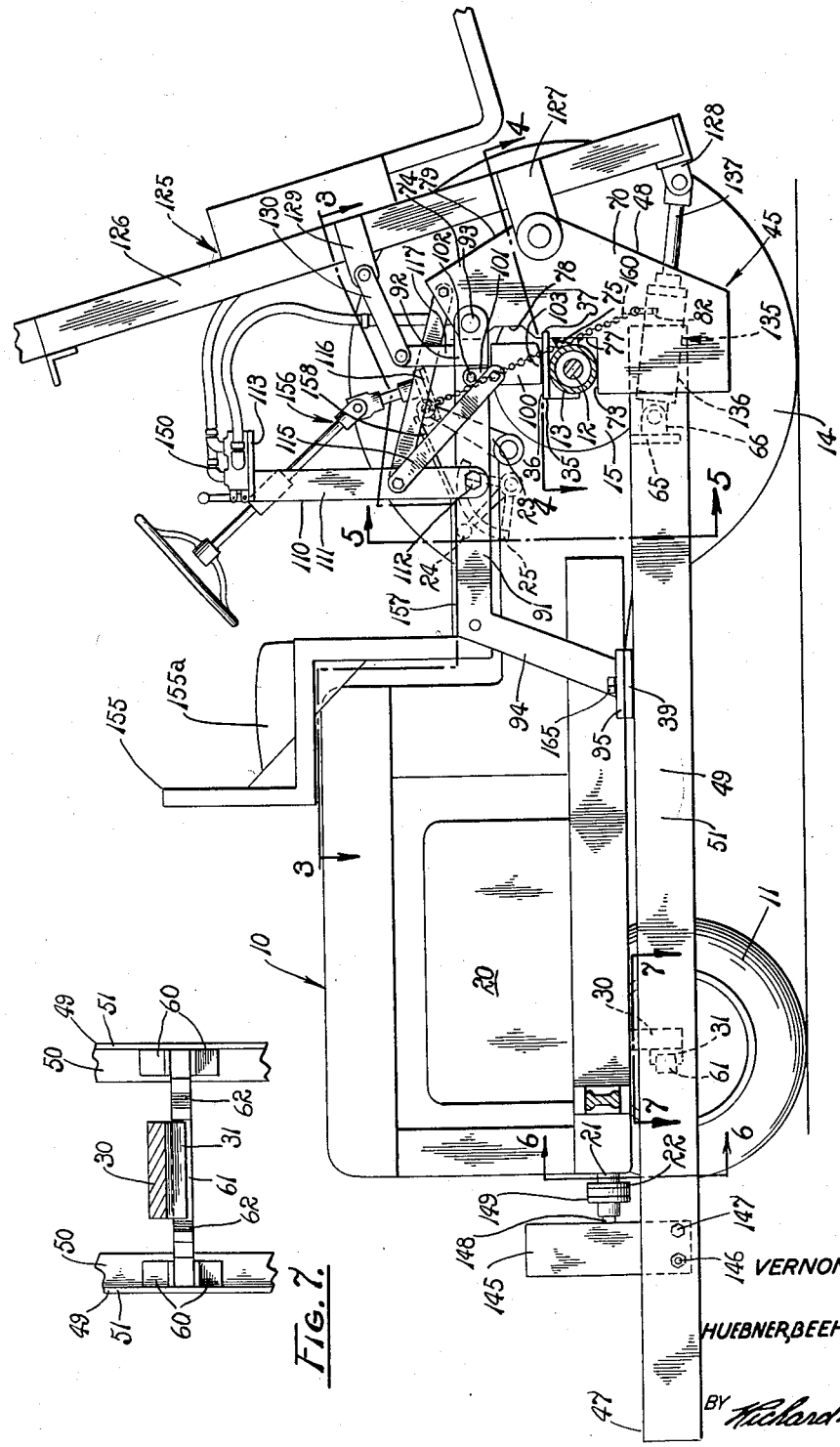

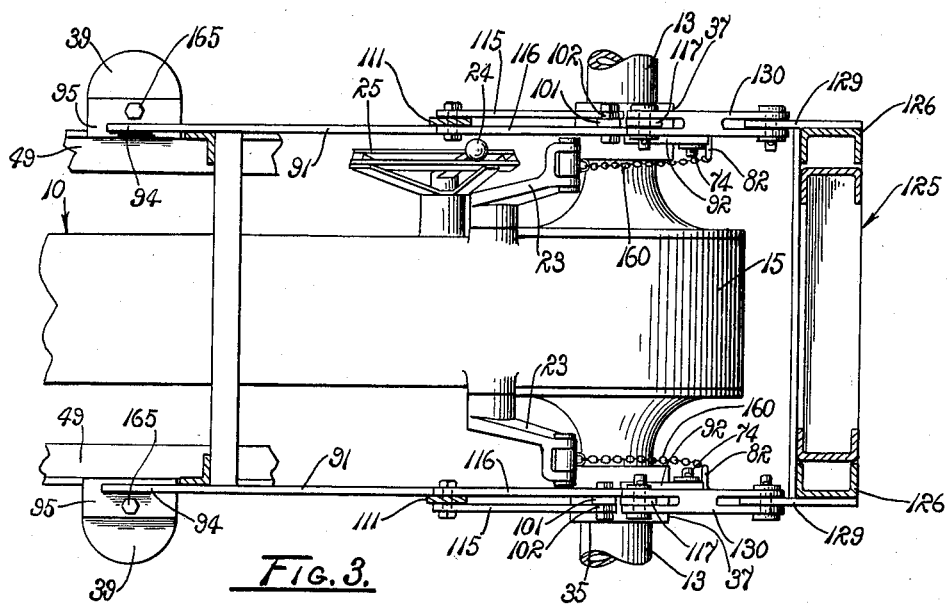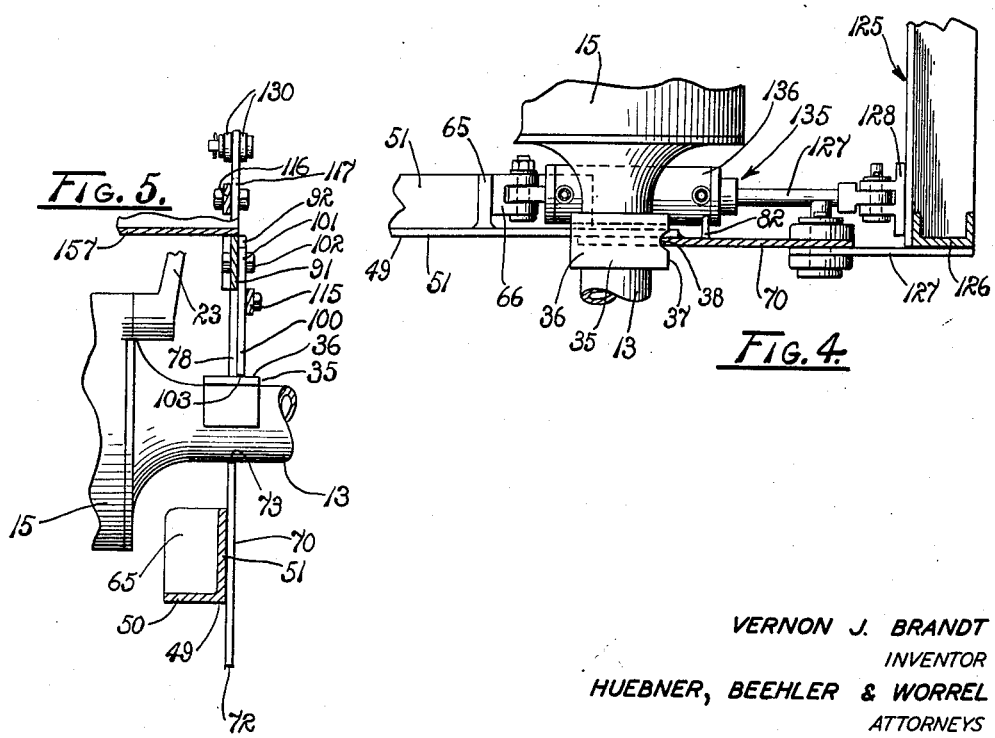

United States Patent Office 2,923,426
Patented Feb. 2, 1960

2,923,426

RELEASABLE TOOL MOUNTING APPARATUS

Vernon J. Brandt, Reedley, Calif.

Application October 14, 1957, Serial No. 690,105

17 Claims. (Cl. 214—674)

The present invention relates to an apparatus for releasably mounting a work tool on a support and more particularly to a sub-frame adapted to have a heavy work tool connected thereto and which is quickly and easily connected to and disconnected from the underside of a vehicle and releasably locked to an axle of the vehicle.

This application is a continuation-in-part of my prior copending application filed January 30, 1956, Serial No. 562,056, now Patent No. 2,883,080, and entitled Releasable Lift Attachment for Tractors. As previously explained in the above identified copending application, it is frequently desirable to mount a fork lift on a tractor for transport of various objects and of products loaded in boxes and stacked on pallets. Conventional lift trucks have not been saitsfactory because their small size tires are designed for hard or paved surfaces and are generally not suited for soft soils or plowed ground. In contrast, the large heavy wheels of tractors are excellently suited for travel over such soft terrain.

Prior to the invention disclosed in my copending application, it had been known to mount fork lifts on tractors, as evidenced by the Lull Patent No. 2,394,458, the Hill Patent No. 2,684,165, and the Jones Patent No. 2,712,391. Because the fork lifts employed normally weigh more than a ton, it was necessary with these prior art devices to use cranes or other expensive, cumbersome, and large hoisting equipment to attach the fork lift to the tractor. Obviously this task required the efforts of several men working together.

Furthermore, the mounting and utilization of a fork lift on a tractor is unlike the utilization of the usual work tools, such as plows, cultivators, and harrows. The forces imposed on the tractor by the fork lift are distinct from those imposed by the usual work tools.

The foregoing problems were in large measure overcome by the device disclosed in my prior copending application referred to above. Briefly, this device provides an elongated tool mounting frame extended beneath the tractor transversely of the rear axle housing and upwardly behind the housing. Coupling means are provided on the tractor and the frame in spaced relation to the rear axle for releasably connecting the frame to the tractor. A linkage is pivotally connected to the portion of the frame extended upwardly behind the axle housing for elevational movement between a lower position engaging a load bearing member on the axle housing and camming the frame upwardly into engagement with the axle housing so that the latter is tightly clamped between the linkage and the frame. The fork lift is mounted on the frame at the rear of the tractor. The device can be attached to a tractor, or detached therefrom, by a single workman in a very short period of time. The subject invention deals with further developments in the manner of coupling or connecting the tool mounting frame underneath the tractor, and in the manner of camming and locking the frame on the rear axle of the tractor.

Accordingly, it is an object of the present invention to provide an apparatus for releasably mounting a work tool on a support.

Another object is to provide an apparatus for mounting a fork lift on a tractor by a single workman in a minimum of time and with a minimum of effort.

Another object is to facilitate the coupling of an elongated tool mounting sub-frame beneath a tractor.

Another object is to move such a tool mounting frame longitudinally relative to the tractor incident to elevational movement for engagement and disengagement of coupling members on the tractor and the sub-frame.

Another object is to provide a coupling device on the tractor and the sub-frame which is connected incident to rearward movement of the frame relative to the tractor and disconnected incident to forward movement of the frame relative to the tractor.

Another object is to lock the sub-frame automatically on the rear axle of the tractor and automatically to unlock the same.

Another object is to provide a linkage system pivotally connected to the sub-frame which is adapted for movement between positions for automatically locking and unlocking the frame relative to the tractor.

Another object is to enable movement of the linkage system as stated in the preceding paragraph by tilting a fork lift supported on the sub-frame.

Other objects are to provide an apparatus of the nature described which is relatively more economical than conventional structures, durable in construction, dependable in operation, adapted to mount a variety of tools on several types of supports, and which is otherwise highly effective for accomplishing its intended purposes.

In the drawings:

Fig. 1 is a side elevation, partially in section and partially fragmentary, of a tractor, a work tool, and a tool mounting apparatus as provided by the present invention. The mounting apparatus is shown detached from the tractor but in an intermediate position in which it would be either while attaching or detaching.

Fig. 2 is a view similar to Fig. 1 except that the mounting apparatus is shown in its fully attached or mounted position on the tractor.

Fig. 3 is a somewhat enlarged fragmentary horizontal section taken on line 3—3 in Fig. 2.

Fig. 4 is a somewhat enlarged fragmentary horizontal section taken on line 4—4 in Fig. 2.

Fig. 5 is a somewhat enlarged fragmentary transverse vertical section taken on line 5—5 in Fig. 2.

Fig. 6 is a transverse vertical section taken on line 6—6 in Fig. 2.

Fig. 7 is a horizontal section taken on line 7—7 in Fig. 2.

Referring more particularly to the drawings, a tractor is illustrated in Figs. 1 and 2 and is generally indicated by the numeral 10. The tractor provides a pair of front wheels 11, a rear axle 12 enclosed by an axle housing 13, and a pair of large rear wheels 14 journaled on the axle. A differential housing is generally indicated by the numeral 15. The expressions "forward" and "rearward," as used herein have reference to the tractor, as normally operated, in the interests of consistency.

The tractor 10 also has an engine generally denoted by the numeral 20 providing a crankshaft 21 extended forwardly from the tractor. A drive coupling 22 is secured to the crankshaft. A pair of hydraulically controlled lift arms 23 are mounted on the opposite sides of the tractor forwardly of the axle housing 13 for elevational pivotal movement about a substantially horizontal common axis. Although the hydraulic system for controlling the lift arms is not shown, it is well known in the art and no further reference is made to it except to note that the system is operated by a control handle 24 movable along a quadrant bar 25.

Referring in particular to Figs. 1, 2 and 6, a dependent plate 30 is secured to the under side of the tractor 10 at its forward end generally between the front wheels 11. An elongated, transversely extended forwardly open female coupling channel 31 is secured in a substantially horizontal position to the plate.

Referring in particular to Figs. 1, 3, 4 and 5, load bearing blocks 35 are mounted on the axle housing 13 on opposite sides of the differential housing 15 and therefore adjacent to the rear wheels 14. Each of the blocks has a substantially horizontal upper surface 36, and a rear outwardly disposed edge 37 in which there is provided a vertically disposed camming groove 38. Substantially horizontal tractor plates 39 are extended laterally outwardly of the tractor 10 intermediate its ends, as best seen in Figs. 1 and 2, and for a purpose to be described.

The work tool mounting apparatus as provided by the present invention is generally indicated by the numeral 45 in Figs. 1 and 2. In addition to the coupling channel 31 and the blocks 35, this apparatus includes an elongated, substantially rectangular, rigid frame 46 having a forwardly extended coupling end 47 and a rearwardly extended mounting end 48. The frame is longer than the tractor 10 but is narrow enough to fit between the wheels 11 or 14. Preferably, the frame is constructed of a pair of transversely spaced, parallel, longitudinal frame members 49 of angle iron providing horizontal flanges 50 and vertical flanges 51. A transverse frame member 52 is extended between the forward ends of the longitudinal frame members. Each of the vertical flanges of the longitudinal frame members has a pair of longitudinally spaced apertures 53 and 54 therein adjacent to the forward end of the frame.

As best seen in Figs. 1, 6 and 7, pairs of spaced angle plates 60 are secured to the horizontal flanges 50 of the longitudinal frame members 49 relatively adjacent to the forward coupling end 47 of the frame 46. Each adjacent pair of angle plates have opposed parallel vertical flanges, and an elongated male coupling rod 61 of generally rectangular cross section provides opposite ends rigidly secured, as by welding, between the vertical flanges of the angle plates. The rod thus extends transversely of the frame in a substantially horizontal position. Inverted V-shaped guide members 62 are secured in longitudinally spaced relation to opposite ends to the rod. The guide members are spaced apart a distance substantially equal to the length of the coupling channel 31.

As best seen in Figs. 1, 2 and 4, rear webs 65 are provided on the longitudinal frame members 49 in normal relation to their flanges 50 and 51, and ears 66 are rigidly, rearwardly extended from the webs.

The mounting frame 46 provides transversely spaced, parallel mounting brackets 70 having lower portions 71 rigidly secured to the rearwardly extended ends of the longitudinal frame members 49 but extended slightly below the longitudinal frame members. The brackets provide lower portions 71 having lower ground engaging edges 72 and intermediate horizontal abutment edges 73, and upper portions 74 upwardly extended from the frame members. These upper portions provide forwardly disposed camming edges 75 having upper and lower, substantially straight, aligned sections 76 and 77, respectively, and intermediate rearwardly concave sections 78. Further the mounting brackets provide rearwardly disposed, convex edges 79. As best seen in Figs. 3 and 4, substantially annular eyelets 82 are secured to the mounting brackets on their inwardly disposed surfaces and in the lower portions thereof.

A linkage system 90 includes a pair of elongated support arms 91 having rear ends 92 pivotally connected to the upper portions 74 of the mounting brackets 70 on their respective sides of the frame 46 by means of pins 93. The support arms also have forwardly extended offset or angulated ends 94, and flat arm plates 95 are secured to the forward ends of the arms. It is to be noted that the arms are mounted on the frame brackets 70 for elevational pivotal movement around a substantially horizontal, common axis between positions forwardly extended over the longitudinal frame members 49 with the rearwardly extended ends of the arms substantially parallel to the longitudinal frame members, as seen in Fig. 2, and upper positions retracted from the lower positions, as seen in Fig. 1.

Detent or camming flaps 100 provide upper ears 101 individually pivotally connected to the rear ends 92 of the arms 91 by pins 102 and lower slightly convex camming edges 103.

An upwardly arched stand 110 provides legs 111 pivotally connected to the rear ends 92 of the arms 91 in forwardly spaced relation to the mounting bracket 70 by means of pins 112. A mounting table 113 interconnects the upper ends of the legs transversely of the support arms 91.

Elongated rigid flap control links 115 individually pivotally interconnect the legs 111 of the stand 110 in upwardly spaced relation to the pivot pins 112 and the detent flaps 100 in downwardly spaced relation to the pins 102. Elongated rigid stand control links 116 individually pivotally interconnect the legs of the stand with the upper portions 74 of the mounting brackets in upwardly and slightly rearwardly spaced relation to the pins 93. It is to be noted that the forward pivotal connections of the links to the legs of the stand pivot about the same axis. Rigid posts 117 are connected to the rear ends 92 of the arms 91 and extend upwardly therefrom.

A fork lift 125 is partially illustrated in the drawings and includes an upright frame 126 having outwardly extended fulcrum lugs 127 pivotally connected to the upper portions 74 of the mounting brackets 70 adjacent to the rear edges 79, lower outwardly extended lugs 128, and upper outwardly extended lugs 129. Fork connecting links 130 releasably pivotally interconnect the posts 117 and the upper lugs of the fork lift.

Hydraulic rams 135 provide cylinders 136 pivotally connected to the ears 66 on the mounting frame 46 and oppositely extended piston rods pivotally connected to the lower lugs 128 on the fork lift 125.

Inasmuch as the hydraulic system for controlling the fork lift 125 forms no material part of the present invention, it is not referred to in great detail. However, it is to be noted that a pump and reservoir, generally indicated by the numeral 145, are pivotally connected to the vertical flanges 51 of the longitudinal frame members 49 at the forward end 47 of the frame 46 by pivot pins 147 extended through the forward apertures 53. The pump and reservoir are thus mounted for pivotal movement between a reclined position, as seen in Fig. 1, and an upwardly extended position rested on the horizontal flanges 50, as seen in Fig. 2. Locking pins 147 extend through the rear apertures 54 for holding the pump and reservoir in the upright position. The pump has a driven shaft 148, and a driven coupling 149 is secured to the latter shaft and is adapted for releasable connection with the drive coupling 22 on the crankshaft 21. Hydraulic controls 150 are mounted on the table 113 and have connection to the pump, the rams 135, and the fork lift 125 in a similar manner to that described in my prior copending application, cited above.

As indicated in Fig. 2, an operator's seat 155 having a removable seat cushion 155a is mounted on the linkage system 90 between the arms 91 adjacent to their forward ends 94. The seat faces rearwardly, and a steering mechanism 156 is mounted on the stand 110 in convenient location relative to the seat. Floor board portions 157 and 158 are also connected between the arms 91 and between the stand legs 111 and are adapted for supporting the feet of an operator positioned in the seat.

Operation

The operation of the above described embodiment of the subject invention is believed to be apparent and is briefly explained at this point.

In order to attach the mounting apparatus 45 having the fork lift 125 already connected thereto to the tractor 10, the frame 46 is positioned on the ground with the edges 72 of the mounting brackets 70 in ground engagement and with the frame members 49 downwardly declined toward their forward ends. The linkage system 90 is in its upwardly retracted position with the seat cushion 155a removed, and the pump and reservoir 145 are rested on the longitudinal frame members. This position of the mounting apparatus is illustrated in Fig. 1.

Thereupon, the tractor 10 is backed up over the apparatus with the tractor wheels 13 and 14 straddling the frame. The tractor is properly positioned relative to the apparatus when the upper sections 76 of the camming edges 75 of the mounting brackets 70 are individually fitted in the camming grooves 39 of the load bearing blocks 35. Before the tractor is backed up far enough to bring the blocks into engagement with the brackets, the conventional forwardly facing operator's seat, not shown, and the normal operating controls are removed, in the same manner as described in my prior copending application, cited above. Chains 160 are then individually connected to the eyelets 82 on the mounting brackets 70 and to the lift arms 23 on the tractor. It is to be noted that the chains angle rearwardly from the lift arms. The control handle 24 is thrust forward from its position of Fig. 1 toward its position in Fig. 2. This causes the lift arms to pivot in a counterclockwise direction, as viewed in Figs. 1 and 2, to raise the chains 160 and thus the rearward end of the mounting frame 46. The mounting frame and the elements borne thereby have a combined center of gravity rearwardly of the rear axle housing 13 whereby initial lifting of the rear end of the frame causes the forward end 47 of the frame to rise. The coupling rod 61 is initially located immediately below the coupling channel 31, that is, when the tractor is backed up into position relative to the mounting frame. When the chains first cause the forward end of the frame to rise, the coupling rod thus moves up closer to but is still directly under the coupling channel.

Immediately after lifting force has been applied to the rear end of the frame 46 and the forward end 47 has risen, the concave sections 78 of the camming edges 75 slide into the respectively associated bearing block grooves 38 causing the entire frame gravitationally to swing forwardly on the chains 160 and thus cause the coupling rod 61 to move forwardly of the coupling channel 31. The rod also moves upwardly into opposed facing relation with the channel because of concurrent upward movement of the frame. Thus it is evident that the chains in being initially slanted rearwardly and being held there by engagement of the upper sections 76 of the camming edges with the grooves, and thereafter being released by the concave sections sliding into the grooves, causes the forward swinging movement of the frame.

As the lower sections 77 of the camming edges slide into the grooves 38, the frame 46 is once again drawn rearwardly to slide the coupling rod 61 rearwardly into the channel 31. Throughout this operation, the lateral guide members 62 maintain transverse alignment of the coupling rod and the channel by their engagement with the opposite ends of the channel, as best visualized in Fig. 6. It will be apparent that the longitudinal distance between the lower edge sections and the rear surface of the rod 61 is substantially equal to the longitudinal distance between the bases of the grooves 38 and the inner surface of the channel 31.

When the frame 46 is moved into its upper substantially horizontal position, the abutment edges 73 of the mounting bracket 70 are in engagement or closely adjacent to the underside of the axle housing 13. Thereupon, the arms 91 are pivoted downwardly by extending the rams 135 until the arm plates 95 rest on the tractor plates 39. During this downward movement, the stand control links 116 pivot the legs 111 around the pins 112 in a clockwise direction, as viewed in Figs. 1 and 2. This movement of the legs causes the flap control links 115 to pivot the flaps 100 in a counterclockwise direction, as viewed in Figs. 1 and 2. The camming edges 103 of the flaps engage the upper surfaces 37 of their respective load bearing blocks 35 thereby to draw the abutment edges 73 of the mounting brackets 70 upwardly into tight engagement with the axle housing. This clamps the axle housing tightly between the flaps and the described abutment edges. Bolts 165 are extended through the engaging tractor and arm plates 39 and 95 to hold the arms 91 in their lower locking positions. In this position, the stand 110 is upwardly extended, the seat 155 is in horizontal position, and the steering mechanism 156 is in a convenient position rearwardly of the seat. The seat cushion 155a is inserted in the seat. The lower sections 77 of the camming edges 75 are fitted in the grooves 38 of the bearing blocks 35 to prevent transverse movement of the mounting apparatus 45 relative to the tractor 10.

Next, the pump and reservoir 145 are pivoted into their upper position, the pins 147 inserted, and the coupling members 149 and 22 connected.

The fork connecting links 130 are then disconnected from either the upper lug 129 or the posts 117. The rams 135 are retracted to pivot the fork lift into a substantially upright position, and connections are made between the auxiliary vehicle operating controls, not shown, and the drive means of the tractor 10 in the manner described in my above identified prior copending application. Thereafter, the fork lift 125 and tractor 10 can both be operated from the seat 155.

The fork lift 125 is just as easily detached from the tractor 10. First, the auxiliary operating controls, not shown, are disconnected from the drive system of the tractor 10. The rams 135 are extended to tilt the fork lift forwardly, as in Fig. 2, and the fork connecting links 130 connected between the fork and the posts 117. The pump and reservoir 145 are pivoted into their reclining position on the front end 47 of the frame 46 by disconnecting the couplings 122 and 49 and removing the locking pins 147. The final preparatory step is to remove the bolts 165 to disconnect the tractor plates 39 from the arm plates 95.

The rams 145 are then retracted to pivot the linkage system 90 into its upper position, as seen in Fig. 1. This lifts the detent flaps 100 out of engagement with the load bearing blocks 35 and releases the frame 46 for lowering movement.

The control handle 24 is pulled rearwardly in a counterclockwise direction, as viewed in Figs. 1 and 2, to lower the lift arms 23. The rear end 48 of the frame 46 drops downwardly with the lower sections 77 of the camming edges 75 sliding along the rear edges 37 of the bearing blocks 35 and in the grooves 48. It is to be observed that the coupling channel 31 and the rod 61 permit elevational movement of the rear of the frame. When the concave sections 78 enter the grooves, the frame gravitationally swings forwardly on the chains 160. This moves the coupling rod forwardly out of the coupling channel. As the lift arms continue to drop, the entire frame moves downwardly and thus the front end of the frame moves down below the coupling channel. When the upper sections 76 of the camming edges enter the grooves, the frame is pulled rearwardly thereby to move the coupling rod back and under the coupling channel. When the front end and the lower edges 72 of the mounting bracket 70 engage the ground, as seen in Fig. 1, the lowering of the frame is completed. Thereupon the chains 160 are disconnected from the lift arms 23 or the eyelets 82, and the tractor 10 is moved forwardly out of the mounting apparatus 45.

The actual performance of commercial embodiments of the subject invention is remarkable. A fork lift weighing approximately 2,500 pounds can be attached to a conventional tractor in minutes by a single workman when using the mounting apparatus of this invention. It is now possible for a farmer to change from a disc harrow, or other earthworking implement normally connected to tractors, to a fork lift and then back again to the earthworking implement in less than an hour. This is in contrast to the use of conventional hoisting equipment to raise the fork lift into mounting position adjacent to a tractor, or to lower it from the tractor, which operations require approximately one-half day and the assistance of several workmen. Perhaps even more significant is the fact that the combination of a tractor, fork lift, and mounting apparatus of the subject invention costs approximately two-thirds as much as a conventional fork lift, commonly known as an industrial truck.

The manner of coupling the sub-frame to the tractor, as above described contributes significantly to the results outlined in the preceding paragraph. Briefly summarized, this is accomplished by swinging the sub-frame longitudinally of the tractor incident to elevational movement of the frame relative to the tractor, by providing couplings which are connected by rearward movement of the frame relative to the tractor and disconnected by forward movement of the frame relative to the tractor, and by automatically locking the frame to the tractor and by unlocking it therefrom incident to tilting the fork lift.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In combination with a vehicle having opposite ends and a substantially horizontal load bearing member mounted in one end of the vehicle; an apparatus for mounting a work tool on the support comprising a frame extended under the load bearing member, connected to the vehicle, and having a portion upwardly extended on one side of the load bearing member; an elongated arm pivotally connected to the upwardly extended portion of the frame for elevational pivotal movement around a substantially horizontal axis between a clamping position over the load bearing member and a position upwardly retracted therefrom, a rigid camming flap pivotally connected to the arm, and linkage means interconnecting the flap, the arm, and the upwardly extended portion of the frame for pivoting the flap into camming engagement with the load bearing member when the arm moves into clamping position thereby to clamp the load bearing member tightly between the flap and the frame and for pivoting the flap out of engagement from the load bearing member when the arm moves into retracted position.

2. In combination with a tractor having a forward end and a rearward end, an apparatus for mounting a work tool on the tractor comprising a substantially horizontal load bearing member mounted in the tractor and having a rearwardly disposed edge, a coupling mounted on the tractor in longitudinally spaced relation to the load bearing member, an elongated substantially horizontal frame member longitudinally extended beneath the tractor and the load bearing member having a forward end and a rearward end, a frame coupling mounted on the forward end of the frame member engageable and disengageable with the tractor coupling incident to elevational adjustment of the frame member relative to the tractor and to longitudinal movement of the frame member forwardly and rearwardly of the tractor, an upright frame member rigidly connected to the rearward end of the horizontal frame member rearwardly of the load bearing member, means connected to one of the frame members for elevationally adjusting the frame members relative to the tractor, the upright frame member having a forwardly disposed camming edge slidably engaging the rearwardly disposed edge of the bearing member incident to elevational movement of the frame toward the tractor for successively permitting forward movement of the frame to position the frame coupling in front of the tractor coupling, and thence moving the frame rearwardly to bring the couplings into engagement, an elongated arm pivotally connected to the upright frame member for elevational pivotal movement around a substantially horizontal axis between a clamping position over the load bearing member and a position retracted therefrom, a rigid camming flap pivotally connected to the arm, and linkage means interconnecting the flap, the arm, and the upright frame member for pivoting the flap into camming engagement with the load bearing member when the arm moves into clamping position thereby to draw the frame tightly up against the tractor and clamp the load bearing member tightly between the flap and the frame and for pivoting the flap out of engagement from the load bearing member when the arm moves into retracted position.

3. In combination with a support vehicle having opposite ends and a substantially horizontal load bearing member transversely extended at one end of the vehicle, an apparatus for mounting a work tool on the vehicle comprising an elongated frame having a tool mounting end extended on one side of the load bearing member and an oppositely extended coupling end, means interconnecting the coupling end of the frame and the vehicle, an elongated arm pivotally connected to the tool mounting end of the frame for elevational pivotal movement around a substantially horizontal axis between a clamping position on the opposite side of the load bearing member from the frame and a position retracted therefrom, a camming flap pivotally connected to the arm for movement around a substantially horizontal axis, and linkage means interconnecting the flap, the arm, and the mounting end of the frame for pivoting the flap into camming engagement with the load bearing member when the arm moves into clamping position thereby to clamp the load bearing member tightly between the flap and the frame and for pivoting the flap out of engagement from the load bearing member when the arm moves into retracted position.

4. In combination with a vehicle having a forward end and a rearward end, an apparatus for mounting a work tool on the vehicle comprising a substantially horizontal load bearing member mounted in the vehicle and having a rearwardly disposed edge, a coupling mounted on the vehicle in longitudinally spaced relation to the load bearing member, an elongated substantially horizontal frame member longitudinally extended beneath the vehicle and the load bearing member having a forward end and a rearward end, a frame coupling mounted on the forward end of the frame member engageable and disengageable with the vehicle coupling incident to elevational adjustment of the frame member relative to the vehicle and to longitudinal movement of the frame member forwardly and rearwardly of the vehicle, an upright frame member rigidly connected to the rearward end of the horizontal frame member rearwardly of the load bearing member, and means connected to one of the frame members for elevationally adjusting the frame members relative to the vehicle, the upright frame member having a forwardly disposed camming edge slidably engaging the rearwardly disposed edge of the bearing member incident to elevational movement of the frame members toward the vehicle for successively moving the forward end of the horizontal frame member forwardly to position the frame coupling in front of the vehicle coupling, and thence rearwardly to bring the couplings into engagement.

5. In combination with a vehicle having forward and rearward end portions, and a substantially horizontal load bearing member mounted in the rearward end portion of the vehicle; an elongated frame having a rear mounting end extended under the load bearing member and a forward coupling end extended under the vehicle; means interconnecting the coupling end of the frame and the vehicle; camming means pivotally connected to the mounting end of the frame for elevational pivotal movement around a substantially horizontal axis between frame locking position in camming engagement with the load bearing member for drawing the frame tightly up against the load bearing member, and a frame releasing position disengaged from the load bearing member; a rigid cam positioning member pivotally connected to the mounting end of the frame for forward and rearward tilting movement about a substantially horizontal axis; linkage means pivotally interconnecting the positioning member in spaced relation to said tilting axis and the camming means for moving the camming means between said frame locking and releasing positions incident to tilting movement of the positioning member; and powered means pivotally interconnecting the positioning member in spaced relation to said tilting axis and the frame for effecting tilting movement of the positioning member.

6. In combination with a tractor having forward and rearward ends, a rear axle housing positioned in said rearward end, an underside, and an elevationally adjustable lift mechanism disposed above and forwardly of the axle housing; an apparatus for mounting a fork lift on the rearward end of the tractor including a horizontal transversely extended forwardly disposed channel mounted on the underside of the tractor at the forward end thereof, an elongated frame extended beneath the underside of the tractor having oppositely extended forward and rearward ends adjacent to the forward and rearward ends, respectively, of the tractor and adapted for elevational movement upwardly into engagement with the underside of the tractor, and a transversely extended horizontal rod mounted on the forward end of the frame adapted for automatic releasable interfitted connection with the channel on the tractor incident to elevational and longitudinal movement of the frame relative to the tractor, and camming means on the axle housing and the rearward end of the frame engageable incident to elevational movement of the frame toward the tractor successively permitting forward movement of the frame and thence drawing the frame rearwardly; a fork lift supported on the end of the frame rearwardly of the axle housing so that the frame and the fork lift have a combined center of gravity rearwardly of the axle housing; and an elongated flexible chain having a lower end connected to the rearward end of the frame rearwardly of the axle housing and an upper end forwardly upwardly extended over the axle housing and connected to the lift mechanism whereby application of lift force on the rearward end of the frame through the chain initially raises the forward end of the frame and continued lifting causes the camming means to permit the frame to swing longitudinally forwardly of the vehicle on the chain to bring the rod into forwardly opposed relation to the channel, and still further upward lifting causes the camming means to draw the rod rearwardly into releasable engagement with the channel.

7. In combination with a tractor having opposite ends and a substantially horizontal load bearing member mounted in one end, an apparatus for mounting a work tool on the tractor comprising an elongated frame having a tool mounting end extended on one side of the load bearing member and an oppositely extended coupling end, means interconnecting the coupling end of the frame and the tractor, an elongated arm pivotally connected to the tool mounting end of the frame for elevational pivotal movement around a substantially horizontal axis between a clamping position on the opposite side of the load bearing member from the frame and a position retracted therefrom, a rigid camming flap pivotally connected to the arm for movement around a substantially horizontal axis, a rigid leg pivotally connected to the arm on the opposite side of the flap from the pivotal connection of the arm to the frame, a rigid flap control link having an end pivotally connected to the leg in spaced relation to the leg's connection to the arm and an opposite end pivotally connected to the flap in spaced relation to the flap's pivotal connection to the arm, and a rigid leg control link pivotally connected to the leg coaxially of the pivotal connection of the flap control link and the leg and an opposite end pivotally connected to the frame in spaced relation to the pivotal connection of the arm to the frame whereby the flap is pivoted into camming engagement with the load bearing member when the arm is moved toward clamping position so as to clamp the load bearing member tightly between the flap and the frame and whereby the flap is pivoted out of engagement from the load bearing member when the arm is moved into retracted position.

8. In combination with a tractor having forward and rearward end portions, an elevationally movable hydraulic lift arm, and a transversely extended rear axle housing; an attachment for mounting a fork lift on the tractor including an elongated rigid frame received beneath the tractor in longitudinal alignment therewith for elevational adjustment upwardly against the tractor and having forward and rearward end portions, a forwardly disposed, substantially horizontal channel transversely mounted beneath the forward end portion of the tractor, an elongated, substantially horizontal rod transversely rigidly mounted in the forward end portion of the frame for slidable reciprocation in the channel incident to elevational adjustment and longitudinal movement of the frame relative to the tractor, a load bearing block mounted on the rear axle housing having a substantially horizontal transversely extended rear camming edge providing a concave groove therein, the frame including a bracket rigidly upwardly extended on the rearward side of the rear axle housing having a substantially horizontal abutment edge engageable with the underside of the axle housing when the frame is moved upwardly against the tractor and a forwardly disposed substantially vertical camming edge slidably engaging the camming edge of the block in the groove thereof and including substantially aligned upper and lower sections and a rearwardly concave intermediate section; a fork lift mounted on the bracket; and an elongated flexible chain having an upper end connected to the lift arm of the tractor and a rearwardly downwardly extended lower end connected to the frame bracket rearwardly of the axle housing, the frame and the elements borne thereby having a combined center of gravity rearwardly of the rear axle housing whereby upon elevation of the lift arm, the forward end of the frame raises initially, the chain sliding the camming edge of the bracket against the camming edge of the block successively along the upper section as the forward end of the frame raises, thence along the concave section to permit the frame to swing forwardly on the chain to bring the coupling rod into forwardly opposed relation to the channel, and thence along the lower section to pull the frame and thus the rod rearwardly into releasable interfitted engagement with the channel, said rod being released from the channel by lowering the arm whereby the frame swings forwardly, thence downwardly and rearwardly incident to sliding engagement of said camming edges.

9. In combination with a tractor having forward and rearward end portions, and a substantially horizontal transversely extended rear axle housing; a fork lift attachment comprising transversely spaced substantially horizontal load bearing blocks rigidly mounted on the axle housing, an elongated, substantially horizontal frame extended beneath the tractor having a forward coupling end and laterally spaced rearward tool mounting portions below and upwardly extended rearwardly of the axle housing, means releasably interconnecting the coupling end of the frame and the tractor, a pair of arms having rearward ends pivotally connected to the upwardly extended mounting portions of the frame for elevational pivotal movement around substantially horizontal axes between lower frame locking positions extended above the axle housing and upwardly retracted positions, and forwardly extended ends, an arched stand having a pair of elongated legs providing lower ends pivotally connected to the arms intermediate their ends and a table interconnecting the legs in transversely spanning relation to the arms, a linkage system pivotally interconnecting the legs of the stand, the flaps, and the mounting portions of the frame for moving the flaps downwardly into camming engagement with the load bearing members incident to movement of the arms into frame locking positions thereby tightly to clamp the axle housing between the rearward end of the frame and the flaps, and for moving the flaps upwardly out of engagement with the load bearing members when the arms move into retracted positions, each of the linkage systems including an elongated rigid flap control link pivotally connected to its respective leg in upwardly spaced relation to the pivotal connection of the leg to the arm and a rearward end pivotally connected to its respective flap in downwardly spaced relation to the pivotal connection of the flap to the arm, and an elongated rigid leg control link having a forward end pivotally connected to the leg on the same axis as the pivotal connection of the flap control link to the leg and a rearwardly extended end pivotally connected to its respective mounting portion of the frame rearwardly and upwardly of the pivotal connection of the arm to the mounting portion, and posts rigidly upwardly extended from the arms; a fork lift pivotally connected to the mounting portions of the frame for forward and rearward tilting movement about a substantially horizontal axis and having portions upwardly and downwardly extended from said axis, the linkage system further including rigid links pivotally interconnecting the posts and the upwardly extended portion of the fork lift; hydraulic rams pivotally interconnecting the frame and the downwardly extended portion of the fork lift having extended positions for moving the arms into their frame locking positions and retracted positions for moving the arms into their retracted positions; and means for connecting the forwardly extended ends of the arms to the tractor in the locking positions of the arms.

10. In combination with an elongated support having opposite ends, an apparatus for mounting a work tool on the support comprising a substantially horizontal load bearing member mounted in one end of the support and having an outwardly disposed edge, a coupling mounted on the support in longitudinally spaced relation to the load bearing member, an elongated lower frame member longitudinally extended beneath the support and the load bearing member having a coupling end adjacent to the support coupling and a mounting end outwardly extended from the load bearing member, a frame coupling mounted on the coupling end of the frame member engageable and disengageable with the support coupling incident to elevational adjustment of the frame member relative to the support and to movement of the frame member longitudinally of the support, an upright frame member rigidly connected to the outwardly extended end of the lower frame member in upwardly outwardly adjacent relation to the load bearing member, and means connected to one of the frame members for elevationally adjusting the frame members relative to the support, the upright frame member having an inwardly disposed camming edge slidably engaging the outwardly disposed edge of the bearing member incident to elevational movement of the frame members toward the support for successively moving the coupling end of the lower frame member endwardly of the support in a predetermined direction to position the frame coupling endwardly outwardly of the support coupling, and thence in the opposite direction longitudinally of the support to bring the couplings into engagement.

11. In combination with a vehicle having a forward end and a rearward end, an apparatus for mounting a work tool on the vehicle comprising a substantially horizontal load bearing member mounted in the rearward end of the vehicle and having a rearwardly disposed edge, a coupling mounted on the vehicle in longitudinally forwardly spaced relation to the load bearing member, an elongated lower frame member longitudinally extended beneath the vehicle and the load bearing member having a forward end and a rearward end, a frame coupling mounted on the forward end of the frame member engageable and disengageable with the vehicle coupling incident to elevational adjustment of the frame member relative to the vehicle and to longitudinal movement of the frame member forwardly and rearwardly relative to the vehicle, an upright frame member rigidly connected to the rearward end of the lower frame member rearwardly of the load bearing member, and means connected to one of the frame members for elevationally adjusting the frame members relative to the vehicle, the upright frame member having a forwardly disposed camming edge slidably engaging the rearwardly disposed edge of the bearing member incident to elevational movement of the frame members toward the vehicle for successively moving the forward end of the lower frame member forwardly to position the frame coupling in front of the vehicle coupling, and thence rearwardly to bring the couplings into engagement.

12. In combination with a vehicle having opposite ends and a substantially horizontal load bearing member mounted on one end of said vehicle, an apparatus for mounting a work tool on the vehicle comprising an elongated frame having a tool mounting end extended on one side of the load bearing member and an oppositely extended coupling end, means interconnecting the coupling end of the frame and the vehicle, an elongated arm pivotally connected to the tool mounting end of the frame for elevational pivotal movement around a substantially horizontal axis between a clamping position on the opposite side of the load bearing member from the frame and a position retracted therefrom, a camming flap pivotally connected to the arm for movement around a substantially horizontal axis, a leg pivotally connected to the arm on the opposite side of the flap from the pivotal connection of the arm to the frame, a flap control link pivotally interconnecting the leg and the flap, and a leg control link pivotally interconnecting the leg and the frame whereby the flap is pivoted into camming engagement with the load bearing member when the arm is moved toward clamping position so as to clamp the load bearing member tightly between the flap and the frame and whereby the flap is pivoted out of engagement from the load bearing member when the arm is moved into retracted position.

13. In combination with an elongated support having opposite ends, and power lift means on the support, an apparatus for releasably mounting a work tool on the support comprising a support coupling dependently mounted at one end of the support, an elongated frame extended beneath the support having a coupling end below the support coupling and an oppositely extended end in longitudinally spaced relation to the support coupling adapted to mount a work tool thereon, the frame being elevationally adjustable upwardly and downwardly relative to the support, means releasably interconnecting the frame and the power lift means for elevationally adjusting the frame relative to the support, a frame coupling mounted in the coupling end of the frame automatically engageable and disengageable with the support coupling incident to elevational adjustment and longitudinal movement of the frame relative to the support, a support cam rigidly mounted on the support adjacent to the opposite end of the support from the support coupling, and a frame cam rigidly mounted on and upwardly extended from the extended end of the frame, said support and frame cams being brought into engagement upon elevational movement of the frame relative to the support, shifting the frame longitudinally relative to the support incident to such elevational movement, and thereby moving the couplings into and out of engagement.

14. In combination with a vehicle having opposite ends, a power actuated lift arm, and a substantially horizontal load bearing member disposed transversely at one end of the vehicle; an apparatus for mounting a work tool on the vehicle comprising an elongated frame extended longitudinally beneath the load bearing member, connected to the vehicle, and having a portion upwardly extended on one side of the load bearing member, an elongated arm pivotally connected to the upwardly extended portion of the frame for elevational pivotal movement around a substantially horizontal axis between a clamping position over the load bearing member and a position upwardly retracted therefrom, rigid means positioned between the arm and the load bearing member rested on said load bearing member and having the arm rested thereon in the clamping position of the arm, means releasably interconnecting the arm and the frame for retaining the arm in clamping position rested on the rigid means, and a linkage releasably interconnecting the rearward end portion of the frame and the lift arm.

15. In combination with a tractor having forward and rearward ends, an axle housing transversely disposed at the rearward end of the tractor, and a power actuated lift arm; an apparatus for mounting a work tool on the tractor comprising a frame extended longitudinally beneath the tractor and having a portion upwardly extended rearwardly of the rear axle housing, a work tool mounted on the portion of the frame rearwardly of the axle housing, releasable means mounted on the frame for supporting the forward end portion of the frame on the forward end portion of the tractor, an elongated arm pivotally connected to the upwardly extended portion of the frame and having an end extended forwardly therefrom transversely over the axle housing for elevational pivotal movement about a substantially horizontal axis between a clamping position supported on the axle housing and a retracted position pivoted upwardly therefrom, means mounted on the extended end of the arm engageable with the frame releasably to interconnect the frame and said extended end of the arm with the arm in clamping position, and a linkage connected to the rearward end portion of the frame forwardly of the combined center of gravity of the frame and the work tool and being connected to the lift arm for raising the frame upwardly against the tractor.

16. The apparatus of claim 15 having load support means positioned between the arm and the axle housing in supporting relation to the arm and weight borne thereby.

17. In combination with a vehicle having a forward end and a rearward end, an apparatus for mounting a work tool on the vehicle comprising a substantially horizontal load bearing member mounted in the vehicle and having a rearwardly disposed edge, a coupling mounted on the vehicle in longitudinally spaced relation to the load bearing member, an elongated substantially horizontal frame member longitudinally extended beneath the vehicle and the load bearing member having a forward end and a rearward end, a frame coupling mounted on the forward end of the frame member for connection with the vehicle coupling when the frame coupling is brought into engagement with the vehicle coupling incident to elevational adjustment of the frame member relative to the vehicle and to longitudinal movement of the frame member forwardly of the vehicle, an upright frame member rigidly connected to the rearward end of the horizontal frame member rearwardly of the load bearing member, and means connected to one of the frame members for elevationally adjusting the frame members relative to the vehicle, the upright frame member having a forwardly disposed camming edge slidably engaging the rearwardly disposed edge of the bearing member incident to elevational movement of the frame members toward the vehicle for bringing the couplings into engagement.

References Cited in the file of this patent

UNITED STATES PATENTS

| | | |
|---|---|---|
| 2,432,589 | Sauder | Dec. 16, 1947 |
| 2,653,678 | Lehrman | Sept. 29, 1953 |
| 2,684,165 | Hill | July 20, 1954 |
| 2,701,072 | Chambers et al. | Feb. 1, 1955 |
| 2,738,083 | Cadwell | Mar. 13, 1956 |